(12) United States Patent
Koerner

(10) Patent No.: US 10,670,943 B2
(45) Date of Patent: Jun. 2, 2020

(54) AUTONOMOUS LOW-POWER VOICE COIL MOTOR PARKING

(71) Applicant: Apple Inc., Cupertino, CA (US)

(72) Inventor: Lucas J. Koerner, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 15/649,319

(22) Filed: Jul. 13, 2017

(65) Prior Publication Data

US 2018/0017845 A1 Jan. 18, 2018

Related U.S. Application Data

(60) Provisional application No. 62/363,053, filed on Jul. 15, 2016.

(51) Int. Cl.
| | | |
|---|---|---|
| *G02B 7/02* | (2006.01) | |
| *G03B 13/36* | (2006.01) | |
| *H04N 5/225* | (2006.01) | |
| *G03B 5/00* | (2006.01) | |

(52) U.S. Cl.
CPC ............... *G03B 13/36* (2013.01); *G03B 5/00* (2013.01); *H04N 5/2254* (2013.01); *H04N 5/2257* (2013.01); *G03B 2205/0069* (2013.01); *G03B 2217/005* (2013.01)

(58) Field of Classification Search
CPC ....................................................... G03B 13/36
USPC ........................................................... 359/814
See application file for complete search history.

(56) References Cited

U.S. PATENT DOCUMENTS

| | | |
|---|---|---|
| 7,518,812 B2 | 4/2009 | Sue et al. |
| 8,543,159 B2 | 9/2013 | Kim |
| 2015/0055234 A1 | 2/2015 | Nakagawa et al. |
| 2015/0212336 A1 | 7/2015 | Hubert et al. |
| 2016/0050373 A1 | 2/2016 | Nakamura |
| 2016/0124242 A1 | 5/2016 | Minamisawa |
| 2017/0115463 A1 | 4/2017 | Osaka et al. |
| 2019/0068852 A1* | 2/2019 | Kang .................. H04N 5/2257 |

OTHER PUBLICATIONS

International Search Report and Written Opinion from PCT/US2017/042069, dated Nov. 10, 2017, Apple Inc., pp. 1-12.

* cited by examiner

*Primary Examiner* — James C. Jones
(74) *Attorney, Agent, or Firm* — Robert C. Kowert; Kowert, Hood, Munyon, Rankin & Goetzel, P.C.

(57) ABSTRACT

A camera module includes an optics assembly, an actuator module, and detection circuitry for preventing the optics assembly from colliding with a mechanical stop due to physical impacts and disturbances. The actuator module includes a magnet and a coil. The detection circuitry detects an induced current caused by movement of the coil with respect to the magnet. The direction of the detected induced current indicates movement of the optics assembly in a particular direction along an optical axis. The detection circuitry provides a current to the coil to cause the optics assembly to move toward a particular position or direction. In some cases, the provided current may cause the optics assembly to move in a direction opposite of the movement that caused the induced current.

20 Claims, 11 Drawing Sheets

AUTONOMOUS LOW-POWER VOICE COIL MOTOR PARKING

This application claims benefit of priority of U.S. Provisional Patent Application No. 62/363,053, filed Jul. 15, 2016, which is hereby incorporated by reference herein in its entirety.

BACKGROUND

The advent of small, mobile multipurpose devices such as smartphones and tablet or pad devices has resulted in a need for high-resolution, small form factor cameras for integration in the devices. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera. Some cameras use a voice coil motor, which may include various combinations of magnets or motors to physically move the position of a camera lens, thereby adjusting the object focal distance of the lens.

Portable devices are often subjected to disturbances, such as dropping a device on the ground or bumping a device into another object. If an external impact causes a movable component, such as a camera lens, to collide with another internal component, damage may occur to one or both components. Moreover, the resultant rattling sound may not be aesthetically pleasing to a user. Thus, even if damage to a given component is minimal, the resultant sound of components colliding may be undesirable.

To prevent damage or rattling sounds from a mobile device, collisions between components must be avoided or minimized. However, actively preventing such collisions may rapidly deplete battery life. For example, constantly providing power to a voice coil motor may help to prevent a camera lens from moving and colliding due to an external disturbance, but much current will be consumed due to current draw. In such devices, the ability to avoid internal component collisions while minimizing power consumption is useful.

SUMMARY

A detection circuit and method for preventing collision of a camera component is disclosed. In one embodiment, a camera module may include an optics assembly, an actuator module for moving the optics assembly, and detection circuitry. The optics assembly may include one or more camera lenses and/or one or more other components. The actuator module may include at least one magnet and at least one coil. In some embodiments, the detection circuitry is configured to detect an induced current in the coil caused by movement of the coil with respect to the magnet. The detected induced current may indicate movement of the optics assembly in a particular direction along an optical axis. In response to detecting the induced current in the coil, the detection circuitry may cause a current to be provided to at least one coil. The provided current may cause the optics assembly to move toward a particular position or direction. In an embodiment, the detection circuitry may cause the optics assembly to decelerate and/or move in a direction opposite of the indicated movement by causing the current to be provided in a direction opposite of the induced current. By moving the optics assembly toward a particular position or direction or in the opposite direction of the indicated movement, the detection circuitry may prevent the optics assembly from contacting a mechanical stop within the camera while the current is provided. In embodiments, the detection circuit detects the induced current and provides the current while the camera module is in a low-power inactive state.

In an embodiment, a multifunction device may include a camera module, a central processing unit connected to the camera module, and a system memory connected to the central processing unit. The system memory may include instructions executable by the central processing unit for capturing an image by the camera module. In one embodiment, the camera module of the multifunction device may include an optics assembly, an actuator module for moving the optics assembly, and detection circuitry. The optics assembly may include one or more camera lenses and/or one or more other components. The actuator module may include at least one magnet and at least one coil. In some embodiments, the detection circuitry is configured to detect an induced current in the coil caused by movement of the coil with respect to the magnet. The detected induced current may indicate movement of the optics assembly in a particular direction along an optical axis. In response to detecting the induced current in the coil, the detection circuitry may cause a current to be provided to the at least one coil in a direction opposite of the induced current. In some embodiments, the provided current may cause the optics assembly to move toward a particular position or direction. In an embodiment, the detection circuitry may cause the optics assembly to decelerate and/or move in a direction opposite of the indicated movement by causing the current to be provided in a direction opposite of the induced current. By moving the optics assembly toward a particular position or direction or in the opposite direction of the indicated movement, the detection circuitry may prevent the optics assembly from contacting a mechanical stop within the camera while the current is provided. In embodiments, the detection circuit detects the induced current and provides the current while the camera module is in a low-power inactive state.

In an embodiment, a method for preventing collision of a camera component may include detecting, by detection circuitry of a camera module, an induced current in a coil of the camera module caused by movement of the coil with respect to a magnet of the camera module. The detected induced current may indicate movement of an optics assembly of the camera module in a particular direction along an optical axis. The method may include, in response to detecting the induced current, causing, by the detection circuitry, a current to be provided to at least one coil in a direction opposite of the induced current. In some embodiments, the provided current may cause the optics assembly to move toward a particular position or direction. In some embodiments, the detection circuitry may cause the optics assembly to decelerate and/or move in a direction opposite of the indicated movement by causing the current to be provided in a direction opposite of the induced current. The method may include preventing, by the detection circuitry, the optics assembly from contacting a mechanical stop of the camera module while the current is provided by causing the optics assembly to move toward the particular position or direction or in the direction opposite of the indicated movement. In embodiments, the method includes detecting, by the detection circuitry, the induced current and providing, by the detection circuitry, the current while the camera module is in a low-power inactive state.

Figure 1:
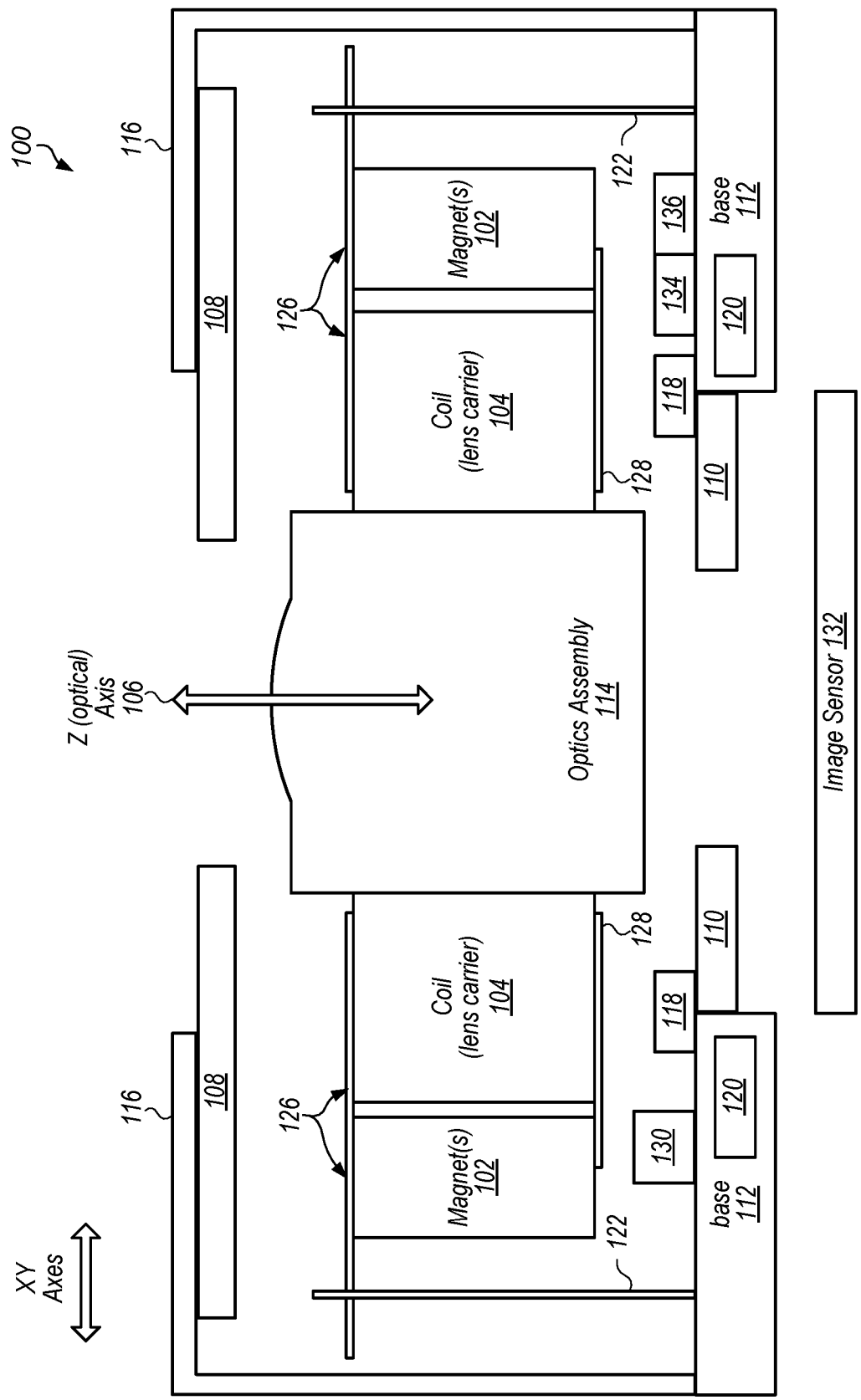
FIG. 1 depicts a side view of an example embodiment of a camera having an actuator module or assembly that may, for example, be used to prevent a lens collision in small form factor cameras, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof. It will also be understood that the term "and/or" as used herein refers to and encompasses any and all possible combinations of one or more of the associated listed items.

DETAILED DESCRIPTION

A camera module or other image processing device may implement different techniques or components to prevent collision of one or more camera components. In one embodiment, a camera module may include a detection circuit configured to detect movement of an optical package (e.g., a lens and/or other camera components) by detecting an induced current in one or more coils caused by movement of the one or more coils with respect to one or more magnets. The detection circuit may then provide a counteracting current to the one or more coils, which causes the optical package to move in a direction opposite of the detected movement, thereby preventing collision of the optical package with a mechanical stop or other component. The detection circuit may provide faster operation and lower power consumption than other techniques, such as an accelerometer or other motion-sensing device.

Some embodiments include camera equipment outfitted with controls, magnets, sensors, and other components to control the position of a miniature actuation mechanism for a compact camera module. More specifically, in some embodiments, compact camera modules include actuators to deliver functions such as autofocus (AF) and prevention of collision of one or more components. One approach to delivering a very compact actuator uses a voice coil motor (VCM) arrangement.

In some embodiments, a camera includes an optics assembly, a camera actuator or actuator assembly/module for moving the optics assembly, one or more mechanical stops at either end or both ends of travel of the optics assembly (e.g., a camera cover or other component), and a detection circuit to prevent contact between the one or more mechanical stops and the optics assembly and/or other camera component. The camera actuator may include at least one of a lens carrier, one or more lenses, one or more coils, one or more magnets, or one or more other components. In some embodiments, the camera actuator includes an optics assembly carrier (e.g., lens carrier) moveably mounted to a camera cover.

In some embodiments, the detection circuit includes one or more comparators that detect an induced current in a coil that is above a threshold value. The detection circuit may provide one or more corresponding comparator outputs to logical circuitry, which determines a direction of the induced current based at least on the one or more corresponding comparator outputs. In some embodiments, the logical circuitry may then cause the detection circuit to provide a counteracting current to the coil. The counteracting current may cause the coil to decelerate and/or move in an opposite direction than the direction of the movement that caused the induced current.

In some embodiments, a camera includes an optics assembly, an image sensor, a magnetic camera actuator for moving the optics assembly relative to the image sensor, a camera cover, and one or more magnets mounted to the camera cover. In some embodiments, the camera actuator includes a lens carrier moveably mounted to a camera cover by one spacers and one or more leaf springs, and one or more coils for moving the optics assembly in a magnetic field.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

FIG. 1 depicts a side view of an example embodiment of a camera (or "camera module") having an actuator module 100 or assembly that may, for example, be used to prevent a lens collision in small form factor cameras, according to at least some embodiments. As one of skill in the art will readily ascertain in light of having read the included disclosure, a wide variety of configurations of an actuator module or assembly fulfill differing design goals in different embodiments without departing from the scope and intent of the present disclosure. For example, in some embodiments, the actuator module may prevent a collision of one or more components of an optical package instead of or in addition to the lens (e.g., a lens carrier).

In some embodiments, each magnet 102 is poled so as to generate a magnetic field, the useful component of which for the autofocus function is orthogonal to the optical axis of the camera/lens, and orthogonal to the plane of each magnet 102 proximate to the autofocus coil 104, and where the field for all four magnets 102 are all either directed towards the autofocus coil 104, or away from it, so that the Lorentz forces from all four magnets 102 act in the same direction along the optical axis 106. In an embodiment, multiple magnets 102 form a position control magnet array. In the example embodiment, the autofocus coil 104 also serves as a lens carrier. In other embodiments, a lens carrier may be separate from the coil 104 (e.g., in between a lens and the coil 104). In embodiments, the coil 104 is a circular loop that surrounds the lens or lens carrier along or proximate to the edge of the lens and/or lens carrier. Upper mechanical stop 1008 and lower mechanical stop 110 as described herein are shown. In embodiments, one or more upper mechanical stops 108 and one or more lower mechanical stops 110 may be any fixed component or portion of the camera or actuator module 100 (e.g., cover assembly, a base assembly, sensor) that may collide with a moveable component of the camera or actuator module 100 (e.g., lens, coil, spring) as a result of movement of the moveable component in either direction along the optical axis by a sufficient distance.

As shown in FIG. 1, an actuator module 100 may also include a base assembly or substrate 112, an optics assembly 114, and a cover 116. In embodiments, the optics assembly 114 may include one or more lenses. In some embodiments, the optics assembly 114 may also include one or more additional moveable components, such as one or more lens carriers, one or more coils, and/or one or more magnets. Base assembly 112 may include one or more of, but is not limited to, a base 112, supporting one or more position sensors (e.g., Hall sensors, TMR/GMR sensors) 118, optical image stabilization coils 120, and suspension wires 122. In the example embodiment, the optics assembly 114, the autofocus coil 104, and/or one or more other components that are moveable along an optical axis.

In at least some embodiments, there are four suspension wires 122. The optics assembly 114 and the coil 104 may be suspended on the base assembly 112 by suspension of the upper springs 1024 on the suspension wires 122. Actuator module 100 may include one or more of, but is not limited to, the optics assembly 114, coil 104, magnet(s) 102, upper spring(s) 126, and lower spring(s) 128. The upper and lower spring(s) may be collectively referred to herein as optics springs. In the actuator module 100, the optics assembly 114 (e.g., a lens or lens assembly of multiple lenses) may be screwed, mounted or otherwise held in or by the coil 104. In at least some embodiments, the optics assembly 114 may be suspended from or attached to the position control magnets 102 by upper spring(s) 126, and lower spring(s) 128, and the magnets 102 may be rigidly mounted to base 112. Note that upper spring(s) 126 and lower spring(s) 128 are flexible to allow the optics assembly 114 a range of motion along the Z (optical) axis for optical focusing, wires 122 are flexible to allow a range of motion on the XY plane orthogonal to the optical axis for optical image stabilization.

In at least some embodiments, there are four suspension wires 122. The optics assembly 114 and the coil 104 may be suspended on the base assembly 112 by suspension of the upper springs 126 on the suspension wires 122. Actuator module 100 may include one or more of, but is not limited to, the optics assembly 114, coil 104, magnet(s) 102, upper spring(s) 126, and lower spring(s) 128. The upper and lower spring(s) may be collectively referred to herein as optics springs. In the actuator module 100, the optics assembly 114 (e.g., a lens or lens assembly of multiple lenses) may be screwed, mounted or otherwise held in or by the coil 104. In at least some embodiments, the optics assembly 114 may be suspended from or attached to the position control magnets 102 by upper spring(s) 126, and lower spring(s) 128, and the magnets 102 may be rigidly mounted to base 112. Note that upper spring(s) 126 and lower spring(s) 128 are flexible to allow the optics assembly 114 a range of motion along the Z (optical) axis for optical focusing, wires 122 are flexible to allow a range of motion on the XY plane orthogonal to the optical axis for optical image stabilization.

The autofocus yoke (e.g., magnets or holder(s) 102) acts as the support chassis structure for the autofocus mechanism of actuator 100. The coil 104 is suspended on the autofocus yoke by an upper autofocus (AF) spring 126 and a lower optics spring 128. In this way when an electric current is applied to the autofocus coil, Lorentz forces are developed due to the presence of the four magnets, and a force substantially parallel to the optical axis is generated to move the coil 104, and hence the optics assembly 114, along the optical axis, relative to the support structure of the autofocus mechanism of the actuator, so as to focus the lens. In addition to suspending the lens carrier and substantially eliminating parasitic motions, the upper spring 126 and lower spring 128 also resist the Lorentz forces, and hence convert the forces to a displacement of the lens.

In some embodiments, an optical image stabilization function includes moving the entire autofocus mechanism of the actuator (supported by the autofocus yoke) in linear directions orthogonal to the optical axis, in response to external forces (e.g., a user handshake), as detected by some means, such a two or three axis gyroscope, which senses angular velocity. In embodiments, the external forces cause changing angular tilt of the camera in 'pitch and yaw directions', which can be compensated by said linear movements of the lens relative to the image sensor. At least some embodiments may achieve this two independent degree-of-freedom motion by using two pairs of optical image stabilization coils, each pair acting together to deliver controlled motion in one linear axis orthogonal to the optical axis, and each pair delivering controlled motion in a direction substantially orthogonal to the other pair. In at least some embodiments, these optical image stabilization coils may be fixed to the camera actuator support structure, and when current is appropriately applied, optical image stabilization coils may generate Lorentz forces on the entire autofocus mechanism of the actuator, moving it as desired. The required magnetic fields for the Lorentz forces are produced by the same four magnets that enable to the Lorentz forces for the autofocus function. However, since the directions of motion of the optical image stabilization movements are orthogonal to the autofocus movements, it is the fringing field of the four magnets that are employed, which have components of magnetic field in directions parallel to the optical axis.

In at least some embodiments, the suspension of the autofocus mechanism on the actuator 100 support structure may be achieved by the use of the four corner wires 122, for example wires with a circular cross-section. Each wire 122 acts as a flexure beam capable of bending with relatively low stiffness, thus allowing motion in both optical image stabilization degrees-of-freedom. However, wire 122 is in some embodiments relatively stiff in directions parallel to the optical axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 122 is stiff in directions that require it to change in length, and hence the fixed points at the ends of each wire (eight points in total) will substantially form the vertices of a parallelepiped for all operational positions of the optical image stabilization mechanism.

In some embodiments, a package of processors and memory 130 or other computer-readable medium may, in some embodiments, be included in actuator module 100. In some embodiments, a package of processors and memory 130 or other computer-readable medium as described herein may alternatively, in some embodiments, be omitted from the actuator module 100 and housed elsewhere in a camera module or device in which the actuator module 100 is installed. Similarly, other components, such as the VCM Driver 134 and/or the detection circuit 136 may, in some embodiments, be omitted from the actuator module 100 and housed elsewhere in a camera module or device in which the actuator module 100 is installed. In some instances, a multifunction device may include a camera module connected to a central processing unit and a memory that is connected to the central processing unit includes instructions executable by the central processing unit for capturing an image by the camera module and/or performing other camera-related functions such as focusing. In embodiments, the optics assembly 114 is positioned above an image sensor 132 of the camera.

In embodiments, the actuator module 100 includes a VCM driver 134 configured to supply current to the coil 104 in order to affect the movement of the optics assembly 114. The actuator module 100 may also include a low-power detection circuit 136. In an embodiment, the detection circuit 136 is integrated into the VCM driver 134. Thus, in embodiments, the VCM driver 134 may include the detection circuit 136. The detection circuit 136 may detect current induced in the coil 104 by motion of the coil 104 through the magnetic field of the fixed magnets 102. For example, the motion of the coil 104 may be caused by an impact of a mobile device that includes the actuator module 100.

In some embodiments, the magnets 102 may move and the coil 104 may be fixed. For example, the position of the magnets 102 and the coil 104 may be switched. In yet other embodiments, a combination of moveable magnets 102 and moveable coils 104 and fixed magnets 102 and fixed coils 104 may be implemented. However, in each embodiment, the relative movement of the one or more coils 104 with respect to the one or more magnets 102 may induce a current in the one or more coils 104, which may be detected by the detection circuit 136.

In some embodiments, the detection circuit 136 detects when the induced current in the coil 104 exceeds a threshold, indicating motion of the optics assembly 114. In response to the detection of the induced current, the VCM driver 134 may be woken and may supply a counteracting current to the coil 104, which counteracts the movement and/or acceleration of the coil 104 and the optics assembly 114. In embodiments, the VCM driver 134 or the detection circuit 136 may determine the direction/sign of the induced current (positive or negative), which indicates the direction of movement of the coil 104 and the optics assembly 114. In response, the detection circuit 136 or the VCM driver 134 may cause the VCM driver 134 to supply a counteracting current to the coil 104 in a direction opposite of the induced current.

In embodiments, the current supplied to the coil 104 by the VCM driver may not always be in a direction opposite of the induced current. For example, in response to the detection of the induced current, the detection circuit 136 may cause a current to be provided to the coil 104 that causes the optics assembly to move toward a particular position or direction along the optical axis. Thus, the provided current may be in a direction opposite of the induced current or in a same direction as the induced current, depending on which current causes the optics assembly to move toward the particular position or direction. For example, the optics assembly 114 may move toward a particular position along the optical axis that is at least a threshold distance away from one or more mechanical stops 108, 110. As another example, the particular position includes a range of distances from one or more mechanical stops 108, 110 along the optical axis. In another example, the particular direction is towards one or more mechanical stops or away from one or more mechanical stops.

In embodiments, the counteracting current may cause the optics assembly 114 to decelerate and/or move in a direction opposite of the movement that caused the induced current. Thus, in embodiments, collision of the optics assembly 114 and/or one or other moveable components of the actuator module 100 with the upper mechanical stop 108 or the lower mechanical stop 110 may be prevented, at least while the counteracting current is provided.

In embodiments, the detection circuit 136 detects the induced current and provides the counteracting current while the camera or camera module that includes the actuator module 100 is in an inactive state and/or low-power state. For example, when the camera is in an active state, the optics assembly is used for focusing and for capturing images. When the camera is in an inactive state, the optics assembly is not used for focusing or for capturing images during the inactive state. In embodiments, the camera module consumers more power while in the active state than while in the inactive state. This may be due to providing power for functions that are not available in an inactive state. For example, constant power or higher current may be provided by the VCM driver 134 in the active state in order to provide autofocus functionality.

In some embodiments, the detection circuit 136 remains inactive while the camera is in an active state. For example, the detection circuit 136 may determine that the camera module is in an active state and in response, prevent the counteracting current from being provided to the at least one coil 104 and/or prevent detection of a current in the coil 104. Additional aspects of the detection circuit 136 and the VCM driver 134 are described herein.

Figure 2:
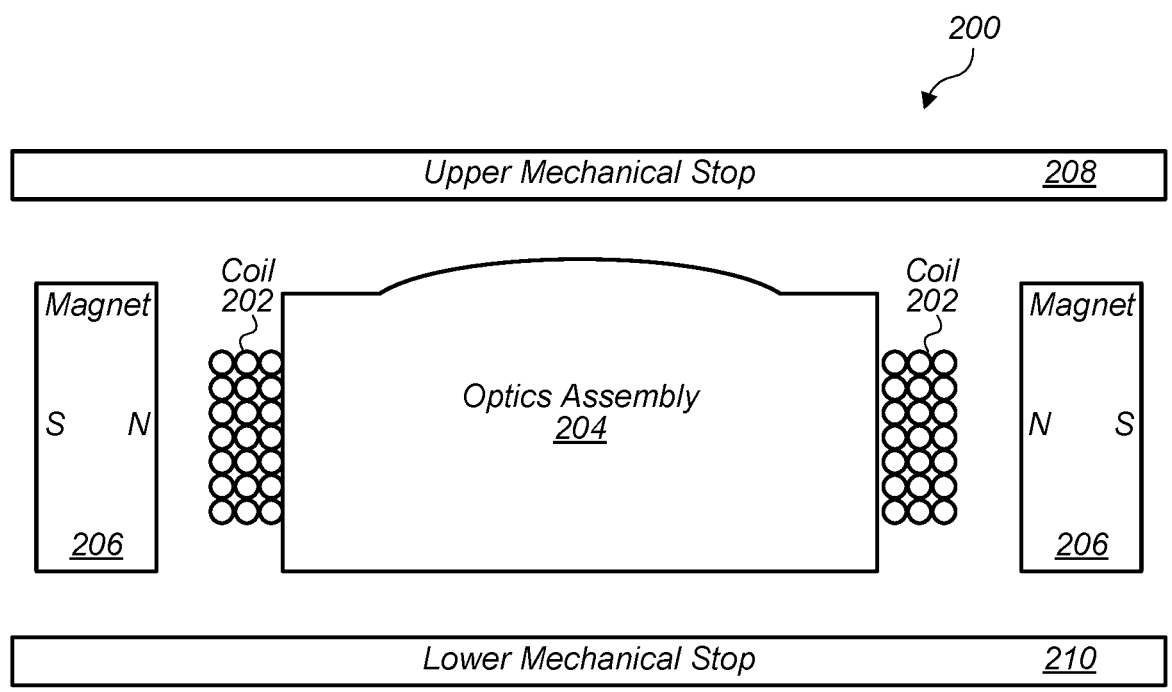
FIG. 2 depicts a side view of another example embodiment of a camera having an actuator module or assembly that may, for example, be used to prevent a lens collision in small form factor cameras, according to at least some embodiments.

FIG. 2 depicts a side view of another example embodiment of a camera having an actuator module 200 or assembly that may, for example, be used to prevent a lens collision in small form factor cameras, according to at least some embodiments. In the example embodiment, one or more coils 202 may serve as a carrier for one or more lenses, such as the optics assembly 204. In other embodiments, a lens carrier may be separate from the coil 202 (e.g., in between the optics assembly 204 and the coil 202). In the example embodiment, the actuator module 200 also includes one or more magnets 206.

In an embodiment, the actuator module 200 of FIG. 2 may be a simplified representation of the actuator module 100 of FIG. 1. Thus, one or more of the components of the actuator module 200 may function in the same or similar manner as one or more of the components of the actuator module 100. For example, the position of the one or more magnets 206 is poled so as to generate a magnetic field, the useful component of which for the autofocus function is orthogonal to the optical axis of the camera/optics assembly 204, and orthogonal to the plane of each magnet 206 proximate to the coil 202, and where the field for each magnet 206 is either directed towards the autofocus coil 104, or away from it, so that the Lorentz forces from each magnet 206 act in the same direction along the optical axis.

In the example embodiment, the camera or actuator module 200 includes an upper mechanical stop 208 and a lower mechanical stop 210. As with the actuator module 100 of FIG. 1, the actuator module 200 of FIG. 2 includes a detection circuit 136 and a VCM driver 134 for detecting an induced current in the coil 202 and for providing a counteracting current to the coil 202.

FIGS. 3A-D illustrate a process for providing a counteracting current to a coil 202 to decelerate and reverse movement of the coil 202, thus preventing a collision with a lower mechanical stop 210, according to at least some embodiments. FIGS. 3A-D also depict an upper mechanical stop 208, a magnet 206, and a horizontal magnetic field component 300 due to the orientation of the magnet 206.

In embodiments, a changing magnetic flux may produce an electromotive force through a closed conductive loop given by, $\varepsilon = d\Phi/dt$, where E is the electric potential and $\Phi$ is the magnetic flux. The induced current can be related to the induced voltage by the resistance of the loop: $I=\varepsilon/R=B*w*v/R$, where R is the resistance, w is the area of the loop, B is the magnetic field and v is the velocity at which the loop moves through the field. As an example, B may have a value of 100 mT, a coil diameter may be 5 mm, and the coil may experience 2 g of acceleration. Thus, if the resistance of a sense resistor is 1 M$\Omega$, then w=19.6e-5 m$^2$ (area from coil diameter), v=0.02 m/s (2 g acceleration for 1 ms), and the voltage across the sense resistor=0.39 V.

Figure 3A:
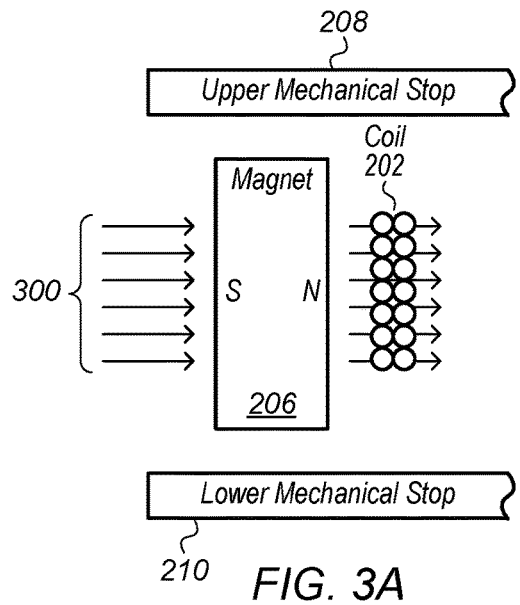
FIGS. 3A-D illustrate a process for providing a counteracting current to a coil to decelerate and reverse downward movement of the coil, thus preventing a collision with a lower mechanical stop, according to at least some embodiments.
Figure 3B:
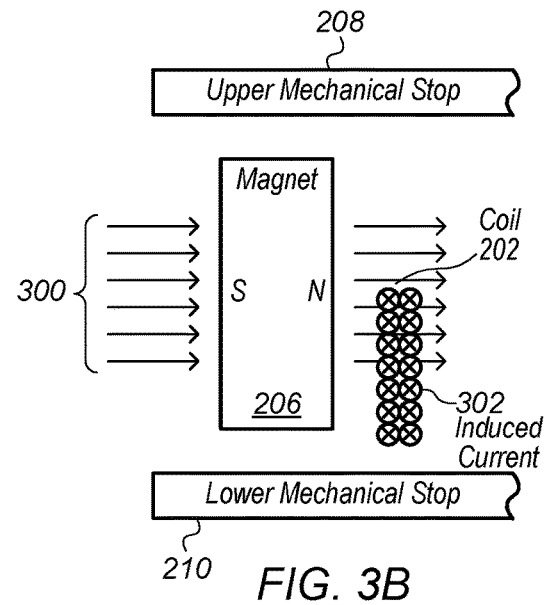
Figure 3C:
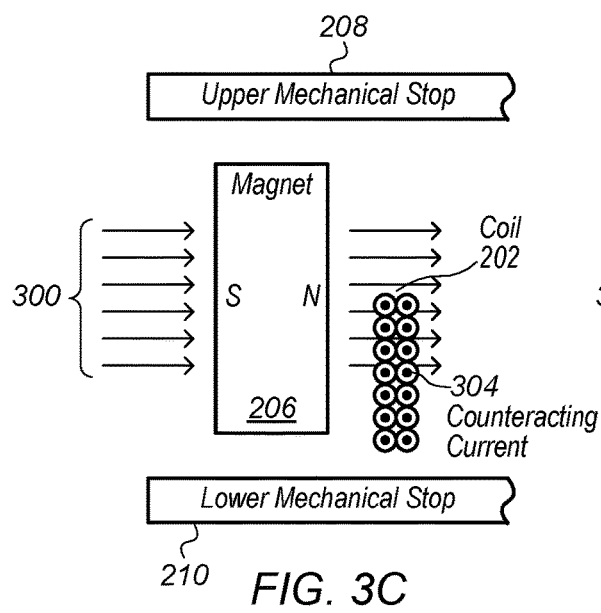

FIG. 3A depicts a state in which the coil 202 is stationary with respect to the magnet 206. FIG. 3B depicts a state in which an induced current 302 is created in the coil 202 caused by movement of the coil 202 in a downward direction with respect to the magnet 206. In the depicted example, the direction of the induced current 302 is flowing into the page. FIG. 3C depicts a state in which a counteracting current 304 is provided to the coil 202 by a VCM driver 134. In embodiments, a detection circuit 136 detects the induced current 302 when it exceeds a predetermined threshold value. In response to detecting the induced current 302 exceeding the predetermined threshold value, the detection circuit 136 causes the VCM driver 134 to provide the counteracting current 304 to the coil 202. In the depicted example, the direction of the counteracting current 304 is flowing out of the page.

The counteracting current 304 causes the coil 202 to decelerate and to move in an upward direction due to the Lorentz force. Thus, in embodiments, the counteracting current 304 prevents the optics assembly 204, which moves in the same direction as the coil 202, from contacting and/or colliding with the lower mechanical stop 210. In embodiments, the counteracting current 304 prevents a lens of the optics assembly 204 from contacting the lower mechanical stop 210. In various embodiments, the counteracting current 304 prevents one or more other moving components from contacting the lower mechanical stop 210 instead of or in addition to the optics assembly 204, such as a lens carrier, coil 202, magnet 206, or spring 128.

Figure 3D:
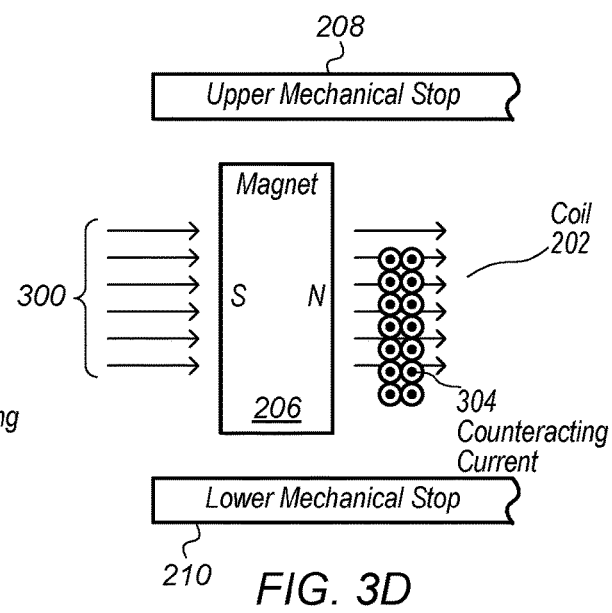

FIG. 3D depicts the coil 202 after it has moved further away from the lower mechanical stop 210 and closer to a "parked" position. In embodiments, a parked position is a position of the coil 202 that is at least a threshold distance from the lower mechanical stop 210 and/or the upper mechanical stop 208. The VCM driver 134 may then stop providing the counteracting current 304 and the coil 202 may return to the position shown in FIG. 3A.

FIGS. 4A-D illustrate a process for providing a counteracting current to a coil 202 to decelerate and reverse movement of the coil 202, thus preventing a collision with a lower mechanical stop 210, according to at least some embodiments. FIGS. 3A-D also depict an upper mechanical stop 208, a magnet 206, and a horizontal magnetic field component 400 due to the orientation of the magnet 206.

Figure 4A:
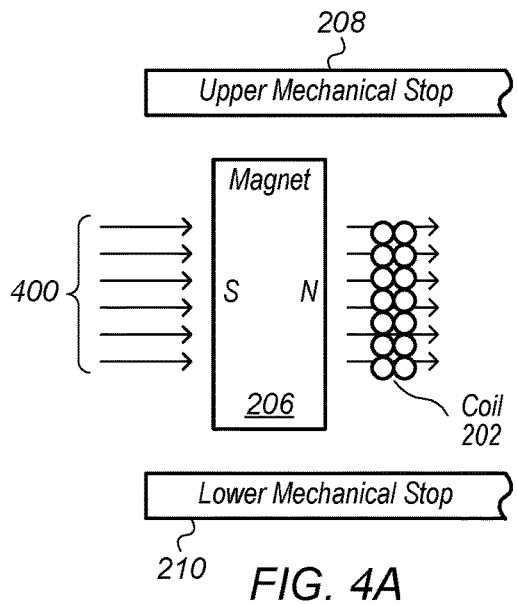
FIGS. 4A-D illustrate a process for providing a counteracting current to a coil to decelerate and reverse upward movement of the coil, thus preventing a collision with an upper mechanical stop, according to at least some embodiments.
Figure 4B:
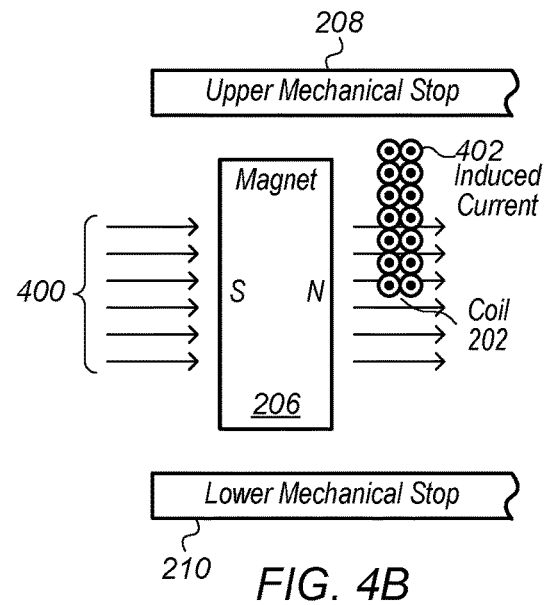
Figure 4C:
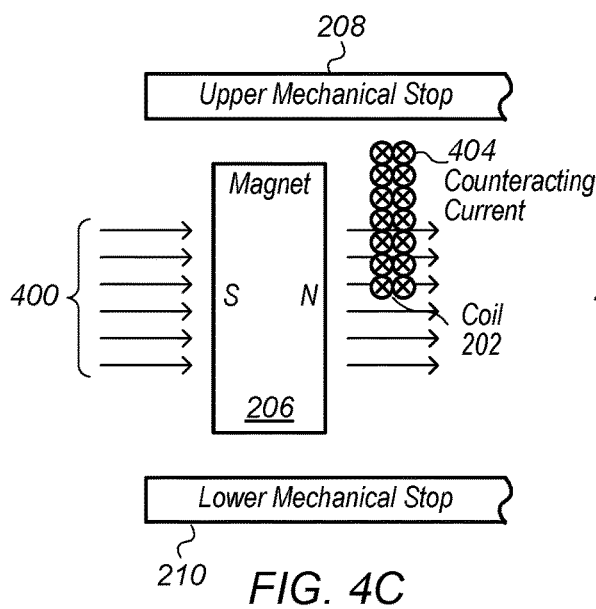

FIG. 4A depicts a state in which the coil 202 is stationary with respect to the magnet 206. FIG. 4B depicts a state in which an induced current 402 is created in the coil 202 caused by movement of the coil 202 in an upward direction with respect to the magnet 206. In the depicted example, the direction of the induced current 402 is flowing out of the page. FIG. 4C depicts a state in which a counteracting current 404 is provided to the coil 202 by a VCM driver 134. In embodiments, a detection circuit 136 detects the induced current 402 when it exceeds a predetermined threshold value. In response to detecting the induced current 402 exceeding the predetermined threshold value, the detection circuit 136 causes the VCM driver 134 to provide the counteracting current 404 to the coil 202. In the depicted example, the direction of the counteracting current 404 is flowing into the page.

The counteracting current 404 causes the coil 202 to decelerate and to move in a downward direction due to the Lorentz force. Thus, in embodiments, the counteracting current 404 prevents the optics assembly 204, which moves in the same direction as the coil 202, from contacting and/or colliding with the upper mechanical stop 208. In embodiments, the counteracting current 404 prevents a lens of the optics assembly 204 from contacting the upper mechanical stop 208. In various embodiments, the counteracting current 404 prevents one or more other moving components from contacting the upper mechanical stop 208 instead of or in addition to the optics assembly 204, such as a lens carrier, coil 202, magnet 206, or spring 128.

Figure 4D:
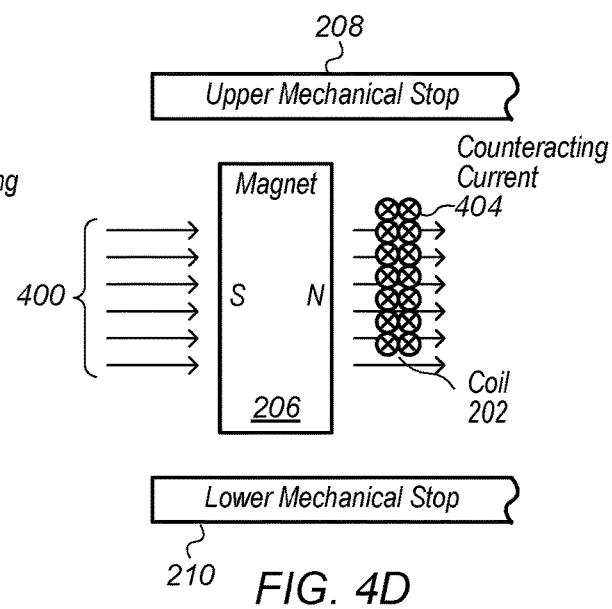

FIG. 4D depicts the coil 202 after it has moved further away from the upper mechanical stop 208 and closer to a "parked" position. In embodiments, a parked position is a position of the coil 202 that is at least a threshold distance from the lower mechanical stop 210 and/or the upper mechanical stop 208. The VCM driver 134 may then stop providing the counteracting current 404 and the coil 202 may return to the position shown in FIG. 3A.

Figure 5:
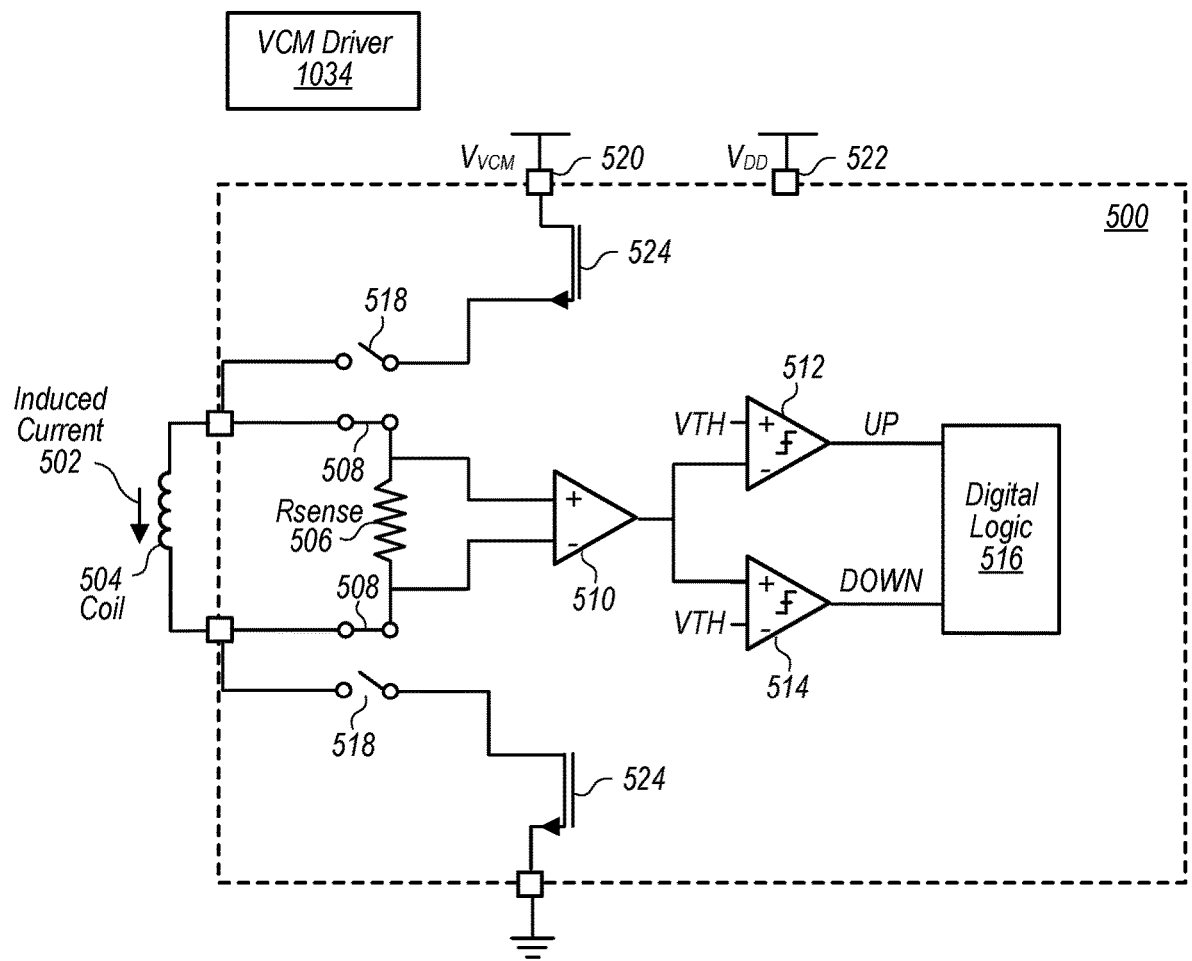
FIG. 5 is a logical block diagram illustrating an example detection circuit in a monitoring state, according to some embodiments.

FIG. 5 is a logical block diagram illustrating an example detection circuit 500 in a monitoring state, according to some embodiments. In the depicted embodiment, the detection circuit 500 detects an induced current 502 in one or more coils 504 caused by movement of the coil 504 relative to one or more magnets, such as the magnets 102 of FIG. 1 or the magnet 206 of FIG. 2. In embodiments, the coil 504 may represent the one or more coils 104 of FIG. 1 or the coil 202 of FIG. 2. In some embodiments, the detection circuit 500 represents the detection circuit 136 of FIG. 1.

In the depicted embodiment, a sense resistor 506 is in parallel with the coil 504. The switches 508 are closed in the monitoring state. The sense amplifier 510 amplifies the voltage across the sense resistor 506. The voltage across the sense resistor 506 is the electromotive force (EMF) due to the induced current 502 caused by movement of the coil 504 relative to one or more magnets. Thus, a changing magnetic flux due to movement of the coil 504 relative to a magnet may produce the EMF. In the example embodiment, the up comparator 512 provides an "up" output signal when the voltage across the sense resistor 506 is a result of the coil 504 moving up. In embodiments, the up comparator 512 outputs the "up" output signal when the voltage across the coil 504 resulting from the coil 504 moving down exceeds a predetermined threshold value. The down comparator 514 provides a "down" output signal when the voltage across the sense resistor 506 is a result of the coil 504 moving up. Similarly, the down comparator 514 outputs the "down" output signal when the voltage across the coil 504 resulting from the coil 504 moving down exceeds a predetermined threshold value.

Thus, in some embodiments, only one of the comparators 512, 514 outputs a signal at a time. In some embodiments, the predetermined threshold values are determined for each comparator by a tuning process. Thus, the predetermined threshold value for a comparator may be raised in response to determining that the comparator is too sensitive for detecting movement (e.g., triggered an output signal when it shouldn't) or lowered in response to determining that the comparator is not sensitive enough for detecting movement (e.g., not triggering an output signal when it should). In embodiments, the threshold value for the up comparator 512 is determined so that a particular upward velocity and/or acceleration of the coil 504 is sufficient to trigger an "up" signal for the up comparator 512. Similarly, the threshold value for the down comparator 512 is determined so that a particular downward velocity and/or acceleration of the coil 504 is sufficient to trigger a "down" signal for the down comparator 514. In some cases, the tuning values for each comparator are stored in the detection circuit 500, the VCM driver 134, or another area of the camera or device housing the camera.

In embodiments, digital logic 516 receives input from the comparator 512 or the comparator 514, depending on the direction of the induced current 502. If the received input is from the up comparator 512, then the digital logic 516 may cause the VCM driver 134 to provide a counteracting current 404 to cause the coil 504 to decelerate and move downward. If the received input is from the down comparator 514, then the digital logic may cause the VCM driver 134 to provide a counteracting current 304 to cause the coil 504 to decelerate and move upward.

In an embodiment, the detection circuit 500 closes the switches 518 in order to provide counteracting current to the coil 504. In some embodiments, the switches open when the counteracting current is provided to the coil 504. In other embodiments, the switches 508 remain closed or are simply not needed, because the resistance of the sense resistor 506 is relatively high compared to resistance of the coil 504. For example, in an embodiment, the sense resistor 506 may have a value of approximately 100 kΩ or more, whereas the coil 504 may have a resistance of approximately 10Ω or less. Further, in some embodiments, the VCM power supply 520 is connected to the coil 504 when the switches 518 are closed. In other embodiments, a different power supply, such as VDD power supply 522 (e.g., constantly connected to a power-rail), is instead connected to the coil 504 when the switches 518 are closed. In the example embodiment, transistors 524 are also implemented to supply the counteracting current to the coil 504. In some embodiments, the detection circuit 500 is a part of the VCM Driver 134, instead of a separate component. In embodiments, the detection circuit 500 is low power and sufficiently simple to operate without a clock. Thus, in some embodiments, the detection circuit 500 may consume a small amount of current to operate (e.g., 1 μA of current or less).

In one embodiment, the detection circuit 500 may implement digital processing of the EMF signal to determine a source of the impact or disturbance that caused the induced current and the EMF signal (e.g., to discriminate between user taps and ambient vibrations from a car ride). The detection circuit 500 may then determine whether or not to provide a counteracting current to the coil 504 based on the determined source. In some embodiments, the above digital signal processing may implement a low power oscillator. The digital logic 516 may determine, based on input from one or more of the comparators 512, 514, one or more results of signal processing of an output signal of the one or more comparators that is based on the induced current (e.g., analysis of one or more frequencies, one or more patterns, one or more changes in magnitude or direction over a period of time, etc.). In response to determining that one or more results of the signal processing meet one or more predetermined criteria, the digital logic 516 may cause the detection circuit 500 or the VCM driver 134 to provide a counteracting current to the coil 504 in a direction opposite of the induced current 502. For example, if the detection circuit 500 determines, based on the one or more results, that one or more user taps or other impacts from a user caused the movement and/or the resulting EMF signal, then a counteracting current may be provided to the coil 504.

In response to determining the one or more results of the signal processing do not meet one or more predetermined criteria, the digital logic 516 may prevent the detection circuit 500 or the VCM driver 134 from providing a counteracting current to the coil 504 in a direction opposite of the induced current 502. For example, if the detection circuit 500 determines, based on the one or more results, that vibrations from a vehicle and/or an external source other than the user caused the movement and/or the resulting EMF signal (and thus fail to meet the one or more predetermined criteria), then the counteracting current may not be provided to the coil 504. The predetermined criteria may be frequency values, voltage levels over a period of time, current levels over a period of time, or any other criteria suitable for comparing to signal processing results.

In embodiments, the detection circuit 500 is connected to a power-rail of the camera module or a device housing the camera module. Thus, the detection circuit 500 may be provided power constantly. In such an embodiment, no additional power supply would need to be added to the camera module or device. In some embodiments, the VCM power supply 520 is constantly on, even when the camera is in a low-power inactive state, so that the detection circuit 500 can monitor for coil 504 movement and provide autonomous parking functionality. In some instances, the constant power may be provided by the VDD power supply 522 instead of the VCM power supply 520.

Figure 6:
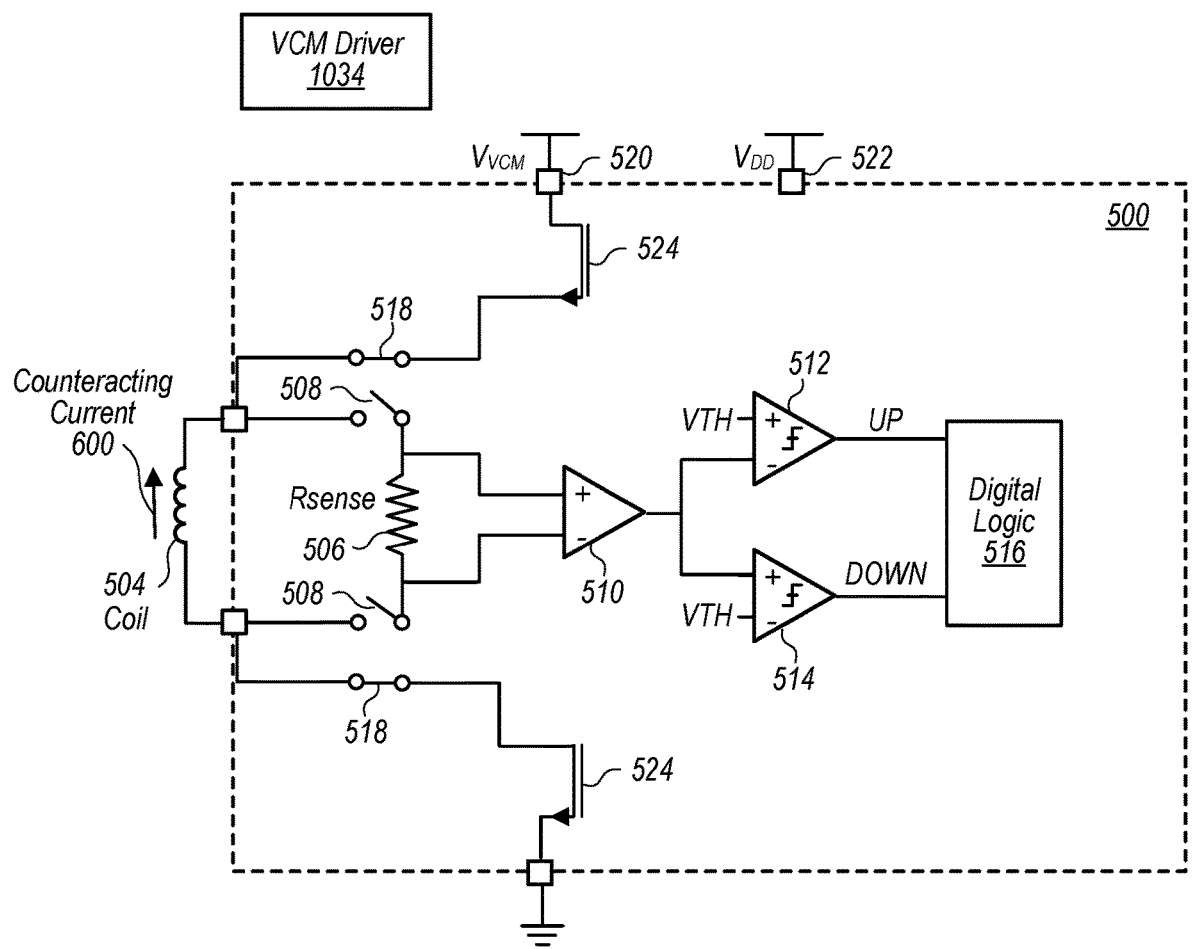
FIG. 6 is a logical block diagram illustrating an example detection circuit in a lens parking state, according to some embodiments.

FIG. 6 is a logical block diagram illustrating an example detection circuit in a lens parking state, according to some embodiments. As shown, the switches 508 are open and the switches 518 are closed to allow the VCM Driver 134 to provide the counteracting current 600 to the coil 504. In the example embodiment, the counteracting current 600 is provided in response to detecting the induced current 502 described for FIG. 5. As described for FIG. 5, in some embodiments, the switches 508 may remain closed or may not be needed because the resistance of the sense resistor 506 is relatively high compared to resistance of the coil 504.

Figure 7:
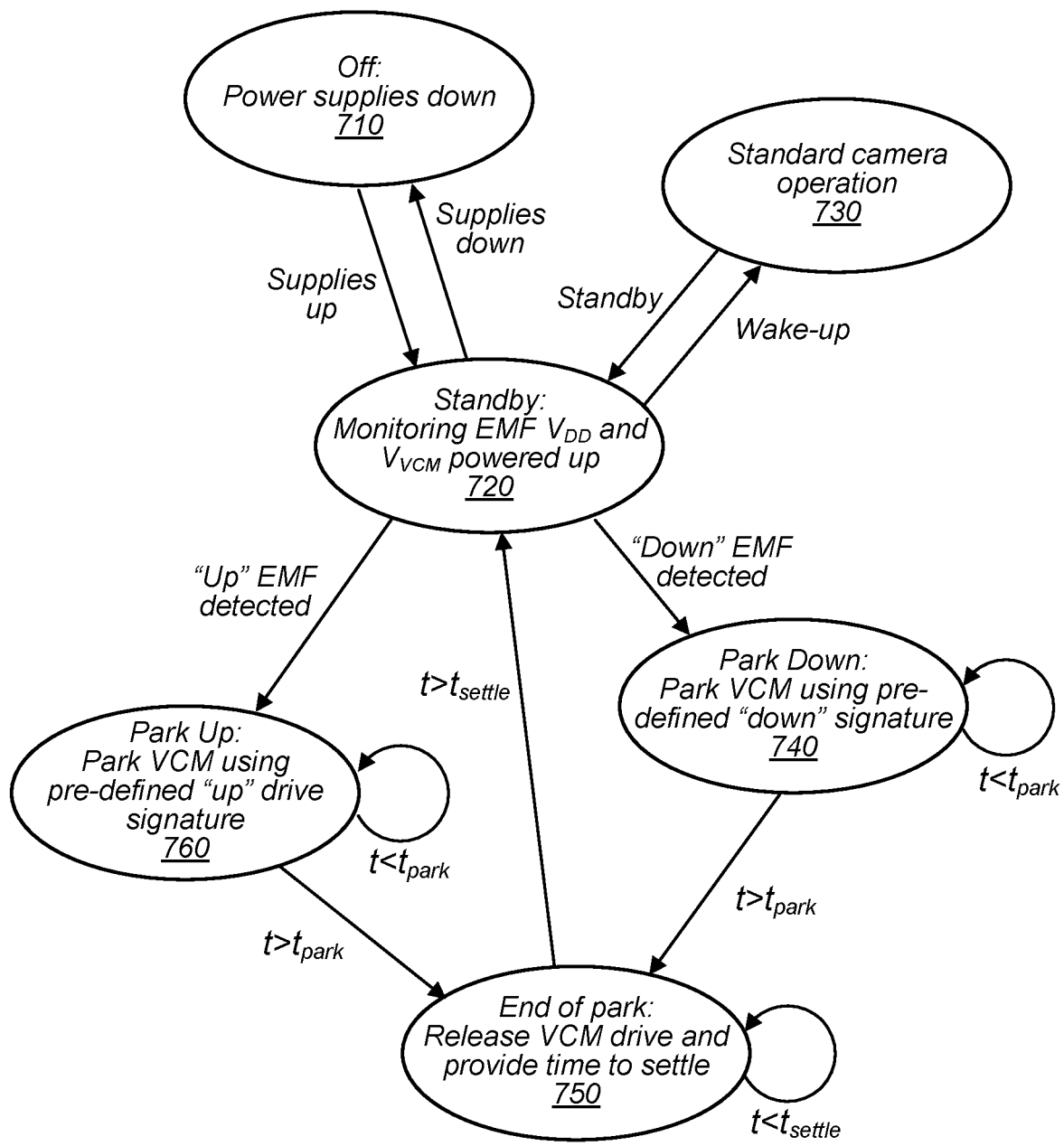
FIG. 7 is a flow diagram of a process for monitoring lens movement and parking a lens to prevent collision, according to some embodiments.

FIG. 7 is a flow diagram of a process for monitoring lens movement and parking a lens to prevent collision, according to some embodiments. The various components described above may implement these techniques (in addition to those described with regard to FIGS. 9-11 below).

The method includes an off state 710, in which the power supplies for the camera and/or the actuator module are powered down. In embodiments, this state may occur when a mobile device that houses the camera is powered down. The method further includes a standby state 720, in which the camera is in an inactive state, but the detection circuit 136 is actively monitoring the coil 202 for an induced current or the EMF caused by the induced current. In embodiments, the VCM power supply and the VDD power supply are powered up in the standby state. In other embodiments, the VCM power supply is powered down or otherwise unavailable in the standby state 720, so the detection circuit is powered by the VDD power supply and the detection circuit 136 causes counteracting current to be provided to the coil 202 by using the VDD power supply. In the standard camera operation state 730, the camera may be in an active state and the detection circuit 136 may be inactive and not used for detecting any induced current. In this state, the VCM may be actively powered for using standard camera functions, such as focusing and capturing images.

The method further includes a park down state 740. In embodiments, the detection circuit 136 enters the park down state 740 in response to detecting a "down" EMF that indicates movement of the coil 202 and/or the optics assembly 114 in a downward direction. In response to detecting the "down" EMF, the detection circuit 136 may cause the VCM Driver 134 to provide a counteracting current to the coil 202 for a predetermined period of time ($t_{park}$). Thus a pre-defined "down" current or voltage signature may be applied to the coil 202 for a predetermined period of time. In embodiments, the predetermined period of time may be based on determining a sufficient amount of time required to decelerate and move the coil 202 and/or the optics assembly 114 in an upward direction to prevent collision with a lower mechanical stop. In embodiments, the camera is in an inactive state during the park down state 740.

After the predetermined period of time has passed, the state may then transition to an end of park state 750. In the end of park state 750, the detection circuit 136 and/or the VCM Drive 134 may prevent the counteracting current from being provided to the coil 202 for a predetermined period of time ("settling time"). In the example embodiment, after the predetermined period of settling time ($t_{settle}$), the detection circuit 136 transitions back to the standby state 720. In some embodiments, the settling time prevents undesirable behavior, such as an oscillating movement of the optics assembly 114 back and forth in an up and down motion. In embodiments, the camera is in an inactive state during the end of park state 750.

The method further includes a park up state 760. In embodiments, the detection circuit 136 enters the park up state 750 in response to detecting an "up" EMF that indicates movement of the coil 202 and/or the optics assembly 114 in an upward direction. In response to detecting the "up" EMF, the detection circuit 136 may cause the VCM Driver 134 to provide a counteracting current to the coil 202 for a predetermined period of time ($t_{park}$). Thus, a pre-defined "up" current or voltage signature may be applied to the coil 202 for a predetermined period of time. In embodiments, the predetermined period of time may be based on determining a sufficient amount of time required to decelerate and move the coil 202 and/or the optics assembly 114 in a downward direction to prevent collision with an upper mechanical stop. After the predetermined period of time has passed, the state may then transition to an end of park state 750. In embodiments, the camera is in an inactive state during the park up state 760.

Figure 8:
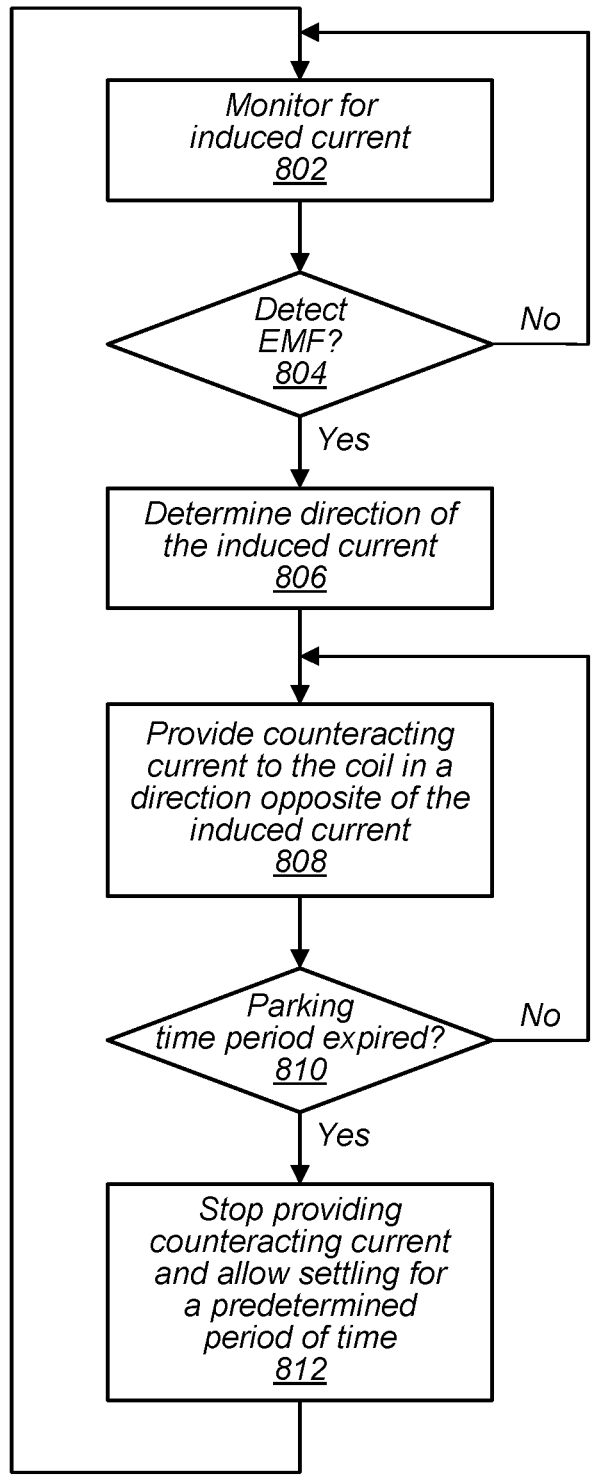
FIG. 8 is a flow diagram of a process for parking a lens and returning to a monitoring state, according to some embodiments.

FIG. 8 is a flow diagram of a process for parking a lens and returning to a monitoring state, according to some embodiments. The various components described above may implement these techniques (in addition to those described with regard to FIGS. 9-11 below).

At 802, the method includes monitoring a coil 202 by a detection circuit 136 for induced current caused by movement of the coil 202. For example, the detection circuit 136 may monitor for an EMF voltage across a sense resistor. At 304, the detection circuit 136 determines whether an EMF voltage is detected. For example, the detection circuit may detect an EMF voltage if the EMF voltage and/or the induced current exceeds a threshold value. If no EMF voltage is detected, the method returns to 802.

If the detection circuit 136 determines that an EMF voltage is detected, then the detection circuit 136 determines the direction of the induced current. For example, the detection circuit 136 may determine the direction based on which comparator input from two different comparators is received by logic circuitry. In response to determining the direction of the induced current, the detection circuit 136 causes a counteracting current to be provided to the coil 202 in a direction opposite of the induced current flow. At 820, the detection circuit 136 determines whether a parking time is expired. If not, then the method remains at step 808. If the parking time is expired, then the detection circuit 136 causes the counteracting current to stop being provided to the coil 202. After a predetermined period of time, the detection circuit 136 returns to a monitoring state at 802.

Figure 9:
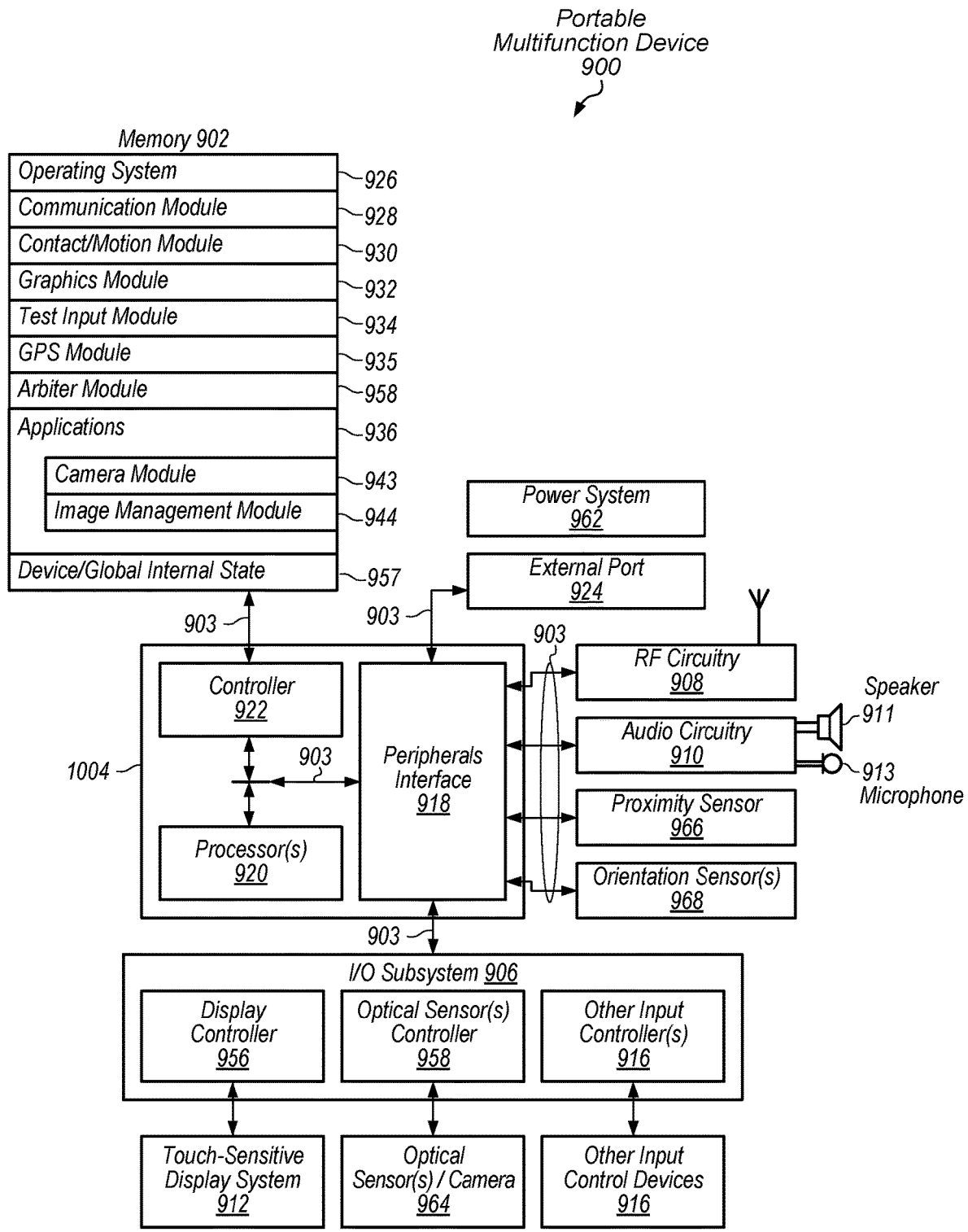
FIG. 9 is a logical block diagram illustrating an example portable multifunction device with a camera module, according to some embodiments.

Attention is now directed toward embodiments of portable devices with cameras. One example of a system that is configured to implement any or all of the techniques described herein is illustrated in FIG. 9. For example, portable multifunction device 900 may include camera 964 in accordance with some embodiments. Camera 964 is sometimes called an "optical sensor" for convenience, and may also be known as or called an optical sensor system. Device 900 may include memory 902 (which may include one or more computer readable storage mediums), memory controller 922, one or more processing units (CPU's) 920, peripherals interface 918, RF circuitry 908, audio circuitry 910, speaker 911, touch-sensitive display system 912, microphone 913, input/output (I/O) subsystem 906, other input or control devices 916, and external port 924. Device 900 may include one or more optical sensors 964. These components may communicate over one or more communication buses or signal lines 903.

It should be appreciated that device 900 is only one example of a portable multifunction device, and that device 900 may have more or fewer components than shown, may combine two or more components, or may have a different configuration or arrangement of the components. The various components shown in FIG. 9 may be implemented in hardware, software, or a combination of hardware and software, including one or more signal processing and/or application specific integrated circuits.

Memory 902 may include high-speed random access memory and may also include non-volatile memory, such as one or more magnetic disk storage devices, flash memory devices, or other non-volatile solid-state memory devices. Access to memory 902 by other components of device 900, such as CPU 920 and the peripherals interface 918, may be controlled by memory controller 922.

Peripherals interface 918 can be used to couple input and output peripherals of the device to CPU 920 and memory 902. The one or more processors 920 run or execute various software programs and/or sets of instructions stored in memory 902 to perform various functions for device 900 and to process data.

In some embodiments, peripherals interface 918, CPU 920, and memory controller 922 may be implemented on a single chip, such as chip 904. In some other embodiments, they may be implemented on separate chips.

RF (radio frequency) circuitry 908 receives and sends RF signals, also called electromagnetic signals. RF circuitry 908 converts electrical signals to/from electromagnetic signals and communicates with communications networks and other communications devices via the electromagnetic signals. RF circuitry 908 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 908 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 910, speaker 911, and microphone 913 provide an audio interface between a user and device 900. Audio circuitry 910 receives audio data from peripherals interface 918, converts the audio data to an electrical signal, and transmits the electrical signal to speaker 911. Speaker 911 converts the electrical signal to human-audible sound waves. Audio circuitry 910 also receives electrical signals converted by microphone 913 from sound waves. Audio circuitry 910 converts the electrical signal to audio data and transmits the audio data to peripherals interface 918 for processing. Audio data may be retrieved from and/or transmitted to memory 902 and/or RF circuitry 908 by peripherals interface 918.

I/O subsystem 906 couples input/output peripherals on device 900, such as touch screen 912 and other input control devices 916, to peripherals interface 918. I/O subsystem 906 may include display controller 956 and one or more input controllers 960 for other input or control devices. The one or more input controllers 960 receive/send electrical signals from/to other input or control devices 916. The other input control devices 916 may include physical buttons (e.g., push buttons, rocker buttons, etc.), dials, slider switches, joysticks, click wheels, and so forth. In some alternate embodiments, input controller(s) 960 may be coupled to any (or none) of the following: a keyboard, infrared port, USB port, and a pointer device such as a mouse. The one or more buttons (e.g., 1108, FIG. 11) may include an up/down button for volume control of speaker 911 and/or microphone 913. The one or more buttons may include a push button (e.g., 1106, FIG. 11).

Touch-sensitive display 912 provides an input interface and an output interface between the device and a user. Display controller 956 receives and/or sends electrical signals from/to touch screen 912. Touch screen 912 displays visual output to the user. The visual output may include graphics, text, icons, video, and any combination thereof (collectively termed "graphics"). In some embodiments, some or all of the visual output may correspond to user-interface objects.

Touch screen 912 may have a touch-sensitive surface, sensor or set of sensors that accepts input from the user based on haptic and/or tactile contact. Touch screen 912 and display controller 956 (along with any associated modules and/or sets of instructions in memory 902) detect contact (and any movement or breaking of the contact) on touch screen 912 and converts the detected contact into interaction with user-interface objects (e.g., one or more soft keys, icons, web pages or images) that are displayed on touch screen 912. In an exemplary embodiment, a point of contact between touch screen 912 and the user corresponds to a finger of the user.

Touch screen 912 may use LCD (liquid crystal display) technology, LPD (light emitting polymer display) technology, or LED (light emitting diode) technology, although other display technologies may be used in other embodiments. Touch screen 912 and display controller 956 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 912. In an exemplary embodiment, projected mutual capacitance sensing technology is used, such as that found in the iPhone®, iPod Touch®, and iPad® from Apple Inc. of Cupertino, Calif.

Device 900 also includes power system 962 for powering the various components. Power system 962 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 900 may also include one or more optical sensors or cameras 964. FIG. 9 shows an optical sensor coupled to optical sensor controller 958 in I/O subsystem 906. Optical sensor 964 may include charge-coupled device (CCD), complementary metal-oxide semiconductor (CMOS) phototransistors, and/or photodiodes. Optical sensor 964 receives light from the environment, projected through one or more lens, and converts the light to data representing an image. In conjunction with imaging module 943 (also called a camera module), optical sensor 964 may capture still images or video. In some embodiments, an optical sensor is located on the back of device 900, opposite touch screen display 912 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display. The camera modules of FIGS. 1-9 may thus be located, positioned, or installed on the front of device 900 and/or on the back of device 900 in various embodiments.

Device 900 may also include one or more proximity sensors 966. FIG. 1 shows proximity sensor 966 coupled to peripherals interface 918. Alternately, proximity sensor 966 may be coupled to input controller 960 in I/O subsystem 906. In some embodiments, the proximity sensor turns off and disables touch screen 912 when the multifunction device is placed near the user's ear (e.g., when the user is making a phone call).

Device 900 may include one or more orientation sensors 968. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 900. In some embodiments, the one or more orientation sensors include any combination of orientation/rotation sensors. FIG. 9 shows the one or more orientation sensors 968 coupled to peripherals interface 918. Alternately, the one or more orientation sensors 968 may be coupled to an input controller 960 in I/O subsystem 906. In some embodiments, information is displayed on the touch screen display in a portrait view or a landscape view based on an analysis of data received from the one or more orientation sensors.

In some embodiments, the software components stored in memory 902 include operating system 926, communication module (or set of instructions) 928, contact/motion module (or set of instructions) 930, graphics module (or set of instructions) 932, text input module (or set of instructions) 934, Global Positioning System (GPS) module (or set of instructions) 935, device/global internal state 957, and applications (or sets of instructions) 936. Device/global internal state 957 may include one or more of: active application state, indicating which applications, if any, are currently active; display state, indicating what applications, views or other information occupy various regions of touch screen display 912; sensor state, including information obtained from the device's various sensors and input control devices 916; and location information concerning the device's location and/or attitude.

Operating system 926 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 928 facilitates communication with other devices over one or more external ports 924 and also includes various software components for handling data received by RF circuitry 908 and/or external port 924. External port 924 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 930 may detect contact with touch screen 912 (in conjunction with display controller 156) and other touch sensitive devices (e.g., a touchpad or physical click wheel). Contact/motion module 930 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 930 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 930 and display controller 956 detect contact on a touchpad.

Graphics module 932 includes various known software components for rendering and displaying graphics on touch screen 912 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like. Text input module 934, which may be a component of graphics module 932, provides soft keyboards for entering text in various applications that need text input.

GPS module 935 determines the location of the device and provides this information for use in various applications (e.g., to camera 143 as picture/video metadata, and to applications that provide location-based services).

Examples of other applications 936 that may be stored in memory 902 include other word processing applications, other image editing applications, drawing applications, presentation applications, JAVA-enabled applications, encryption, digital rights management, voice recognition, and voice replication.

In conjunction with touch screen 912, display controller 956, optical sensor(s) 964, optical sensor controller 958, contact module 930, graphics module 932, and image management module 944, camera module 943 includes executable instructions to capture still images or video (including a video stream) and store them into memory 902, modify characteristics of a still image or video, or delete a still image or video from memory 902.

In conjunction with touch screen 912, display controller 956, contact module 930, graphics module 932, text input module 934, and camera module 943, image management module 944 includes executable instructions to arrange, modify (e.g., edit), or otherwise manipulate, label, delete, present (e.g., in a digital slide show or album), and store still and/or video images.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 902 may store a subset of the modules and data structures identified above. Furthermore, memory 902 may store additional modules and data structures not described above.

In some embodiments, device 900 is a device where operation of a predefined set of functions on the device is performed exclusively through a touch screen and/or a touchpad. By using a touch screen and/or a touchpad as the primary input control device for operation of device 900, the number of physical input control devices (such as push buttons, dials, and the like) on device 900 may be reduced.

The predefined set of functions that may be performed exclusively through a touch screen and/or a touchpad include navigation between user interfaces. In some embodiments, the touchpad, when touched by the user, navigates device 900 to a main, home, or root menu from any user interface that may be displayed on device 900. In such embodiments, the touchpad may be referred to as a "menu button." In some other embodiments, the menu button may be a physical push button or other physical input control device instead of a touchpad.

Figure 11:
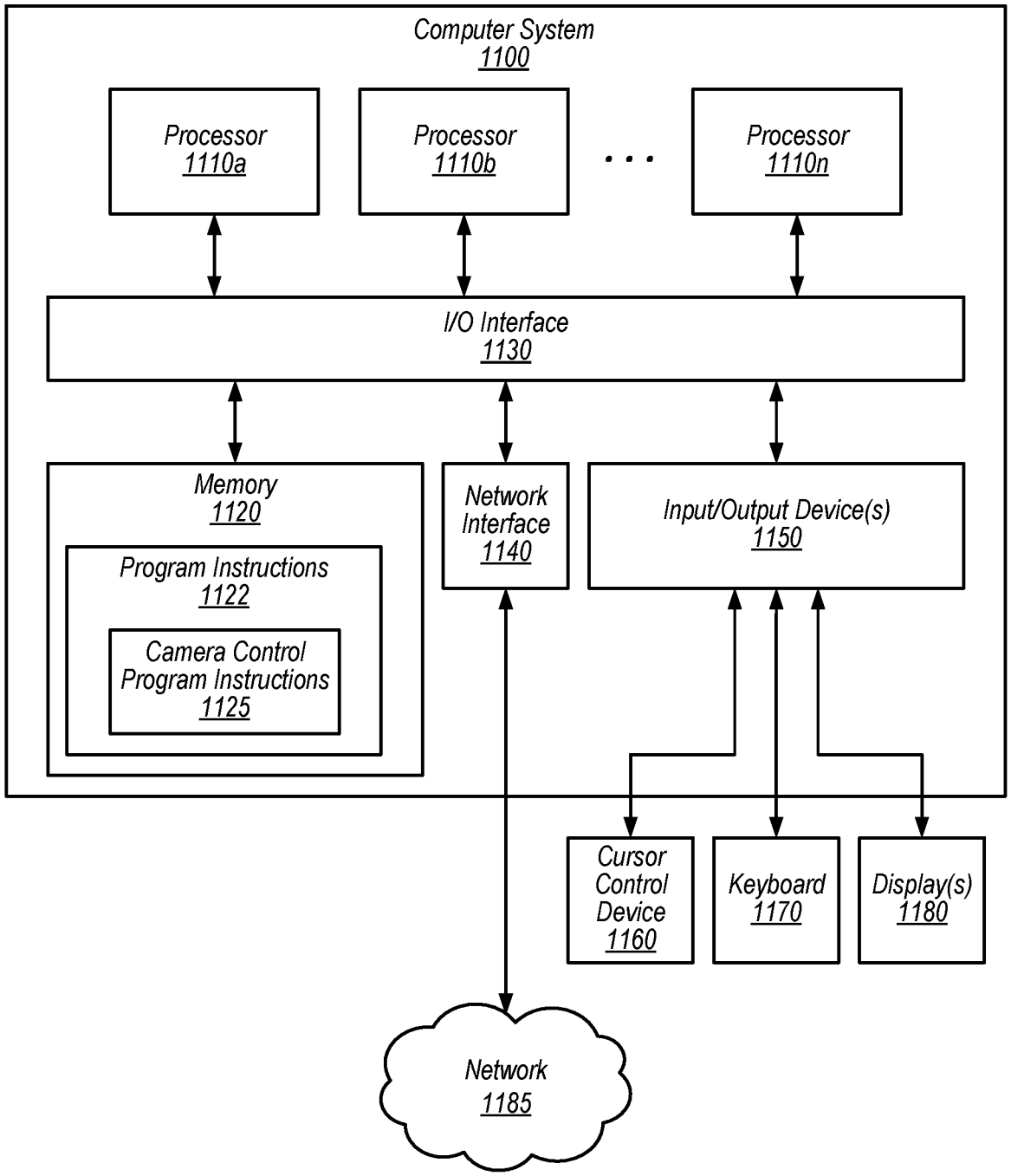
FIG. 11 is a logical block diagram illustrating an example computer system, according to some embodiments.

In different embodiments, device 900 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera. Example embodiments of device 900 are illustrated in FIGS. 11 and 12, which are discussed below.

Figure 10:
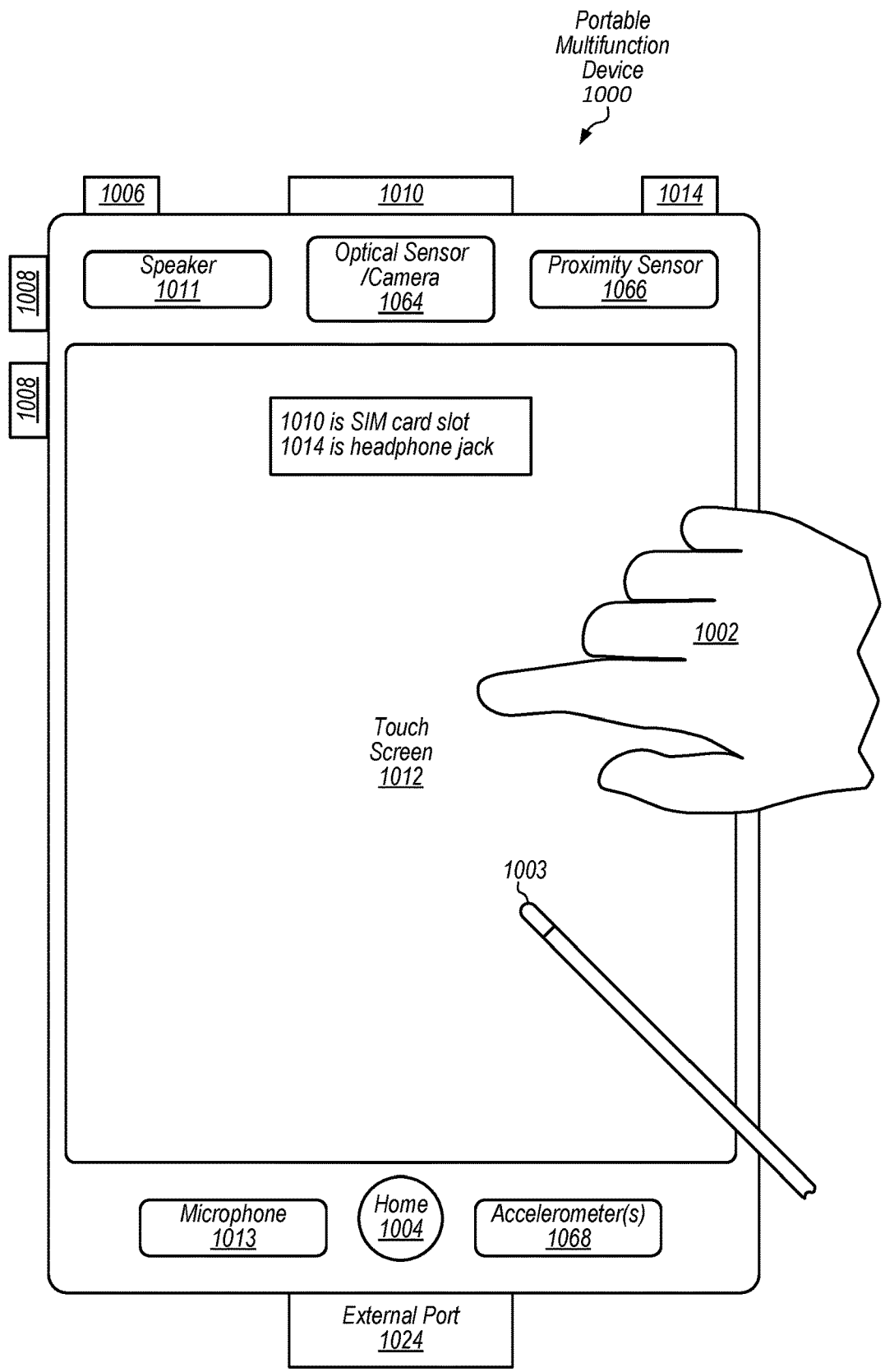
FIG. 10 is a logical block diagram illustrating an example portable multifunction device having a camera module, according to some embodiments.

FIG. 10 is a logical block diagram illustrating an example portable multifunction device, according to some embodiments. FIG. 10 illustrates a portable multifunction device 1000 having a touch screen 1012 in accordance with some embodiments. The portable multifunction device 1000 may be an example of the portable multifunction device 900 of FIG. 9. The touch screen may display one or more graphics within user interface (UI). In this embodiment, as well as others described below, a user may select one or more of the graphics by making a gesture on the graphics, for example, with one or more fingers 1002 (not drawn to scale in the figure) or one or more styluses 1003 (not drawn to scale in the figure).

Device 1000 may also include one or more physical buttons, such as "home" or menu button 1004. As described previously, menu button 1004 may be used to navigate to any application 936 in a set of applications that may be executed on device 1000. Alternatively, in some embodiments, the menu button is implemented as a soft key in a GUI displayed on touch screen 1012.

In one embodiment, device 1000 includes touch screen 1012, menu button 1004, push button 1006 for powering the device on/off and locking the device, volume adjustment button(s) 1008, Subscriber Identity Module (SIM) card slot 1010, head set jack 1014, and docking/charging external port 1024. Push button 1006 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also may accept verbal input for activation or deactivation of some functions through microphone 1013.

It should be noted that, although many of the following examples will be given with reference to optical sensor/camera 1064 (on the front of a device), rear-facing camera or optical sensor that is pointed opposite from the display may be used instead of optical sensor/camera 1064.

FIG. 11 is a logical block diagram illustrating computer system 1200 that is configured to execute any or all of the embodiments described above. For example, computer system 1200 may be configured similarly to portable multifunction device 900 of FIGS. 9 and 10. In different embodiments, computer system 1200 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera module as described herein, may be executed in one or more computer systems 1100, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. In some embodiments, processors 1110 may be configured to send control signals to a solid state lens in a camera module, where the camera module is connected to processors 1110 by a flexible circuit board configured to communicate via I/O interface 1130. In various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of CPU(s) 1110 may commonly, but not necessarily, implement the same ISA. Processors 1110 may employ any microarchitecture, including scalar, superscalar, pipelined, superpipelined, out of order, in order, speculative, non-speculative, etc., or combinations thereof. Processors 1110 may include circuitry to implement microcoding techniques. Processors 1110 may include one or more processing cores each configured to execute instructions. Processors 1110 may include one or more levels of caches, which may employ any size and any configuration (set associative, direct mapped, etc.).

System memory 1120 may be configured to store camera control program instructions 1125 and/or camera control data accessible by processor 1110. In various embodiments, system memory 1120 may be implemented using any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 1100 in a chip-on-chip configuration, a package-on-package configuration, or a multi-chip module configuration. In some embodiments, system memory 1120 may store pixel data or other image data or statistics in various formats. Similarly, while the example system 1100 illustrated in FIG. 11 may include persistent storage for non-volatile storage of image data or other data used in the system, in other embodiments, the system may include other types of non-volatile memory (e.g. read-only memory (ROM)) for those purposes. In an embodiment, system memory 1120 may include data, such as a camera control program instructions 1125. In the illustrated embodiment, program instructions 1125 may be configured to implement a lens control application (e.g., camera control program instructions 1125) incorporating any of the functionality described above. Additionally, existing camera control data of memory 1120 may include any of the information or data structures described above. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor(s) 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions (e.g., camera control program instructions 1125), which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Those skilled in the art will appreciate that system 1100 is merely illustrative and is not intended to limit the scope of embodiments. For example, system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 1120 may be executed by processor(s) 1110 to provide various functions of system 1100.

In other embodiments, various functions may be performed by software components executing in memory on another device and communicating with the illustrated system via inter-computer communication. Some or all of these software components or any data structures described herein may be stored (e.g., as instructions or structured data) in system memory 1120, in persistent storage, or may be stored on a non-transitory computer-readable medium or a portable article to be read by an appropriate drive. In some embodiments, instructions stored on a computer-accessible medium separate from system 1100 may be transmitted to system 1100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RANI (e.g. SDRAM, DDR, RDRAM, SRAM, etc.), ROM, etc.

As described above, the use of a low-power detection circuit to monitor for induced current and to provide a counteracting current prevents the lens or optics assembly from physical damage by preventing a collision with a mechanical stop. Furthermore, unwanted noise, such as rattling, may be avoided. The use of the detection circuit to monitor for induced current avoids the need to use other more power-consuming methods, such as a powered accelerometer or actively powering a VCM coil. A detection circuit may also respond faster than an accelerometer, due to computational delays caused by processing of data by the accelerometer and by sending data to other processors/components of a camera. As discussed above, the low-power detection circuit can monitor for induced current even when the camera is in a low-power inactive state, resulting in power savings and increased battery life. Therefore, a camera module may as described above and illustrated in the Figures include the detection circuit that enables the camera module to monitor and counteract lens movement due to impacts or other disturbances without the need to use other solutions that consume much more power.

What is claimed is:

1. A camera module, comprising:
   an optics assembly;
   an actuator module for moving the optics assembly, wherein the actuator module comprises:
   at least one magnet;
   at least one coil; and
   detection circuitry configured to:
   detect an induced current in the at least one coil caused by movement of the at least one coil with respect to the at least one magnet, wherein the detected induced current indicates movement of the optics assembly in a particular direction; and
   in response to the detection of the induced current, cause a current to be provided to the at least one coil, wherein the provided current causes the optics assembly to move toward a particular position or direction.

2. The camera module of claim 1, wherein the camera module further comprises driver circuitry and at least one mechanical stop, and wherein the detection circuitry is further configured to:
   prevent the optics assembly from contacting the at least one mechanical stop while the current is provided by causing the driver circuitry to provide the current.

3. The camera module of claim 1, wherein to move the optics assembly toward the particular position or direction, the detection circuitry is further configured to:
   cause the optics assembly to move in a direction opposite of the indicated movement by causing the current to be provided in a direction opposite of the induced current.

4. The camera module of claim 1, wherein to cause the current to be provided to the at least one coil, the detection circuitry is further configured to:

cause the current to be provided to the at least one coil for a predetermined period of time.

5. The camera module of claim 4, wherein the detection circuitry is further configured to:
subsequent to causing the current to be provided to the at least one coil for the predetermined period of time, prevent the current from being provided to the at least one coil for another predetermined period of time.

6. The camera module of claim 1, wherein, to detect the induced current and to provide the current, the detection circuitry is further configured to:
detect the induced current and cause the current to be provided while the camera module is in an inactive state, wherein the optics assembly is used for focusing and for capturing images during an active state, and wherein the optics assembly is not used for focusing or for capturing images during the inactive state, and wherein the camera module consumes more power while in the active state than while in the inactive state.

7. The camera module of claim 1, wherein the optics assembly comprises at least a camera lens and a lens carrier.

8. A multifunction device, comprising:
a camera module;
a central processing unit connected to the camera module; and
a non-transitory system memory connected to the central processing unit, wherein the system memory comprises instructions executable by the central processing unit for capturing an image by the camera module; and
wherein the camera module comprises:
an optics assembly;
an actuator module for moving the optics assembly, wherein the actuator module comprises:
at least one magnet;
at least one coil; and
detection circuitry configured to:
detect an induced current in the at least one coil caused by movement of the at least one coil with respect to the at least one magnet, wherein the detected induced current indicates movement of the optics assembly; and
in response to the detection of the induced current, cause a current to be provided to the at least one coil, wherein the provided current causes the optics assembly to move toward a particular position or direction.

9. The multifunction device of claim 8, wherein the camera module further comprises driver circuitry and at least one mechanical stop, and wherein the detection circuitry is further configured to:
prevent the optics assembly from contacting the at least one mechanical stop while the current is provided by causing the driver circuitry to provide the current.

10. The multifunction device of claim 8, wherein, to detect the induced current and to provide the current, the detection circuitry is further configured to:
detect the induced current and cause the current to be provided while the camera module is in an inactive state, wherein the optics assembly is used for focusing and for capturing images during an active state, and wherein the optics assembly is not used for focusing or for capturing images during the inactive state, and wherein the camera module consumes more power while in the active state than while in the inactive state.

11. The multifunction device of claim 8, wherein the detection circuitry further comprises:

two comparators configured to detect opposite directions of current in the at least one coil; and
logical circuitry; wherein the logical circuitry is configured to:
determine a direction of the induced current based on an output signal from at least one of the two comparators, wherein to cause the current to be provided to the at least one coil, the detection circuitry is further configured to:
in response to a determination of the direction of the induced current, cause the current to be provided to the at least one coil in the direction opposite of the determined direction of the induced current.

12. The multifunction device of claim 8, wherein to detect the induced current in the at least one coil, the detection circuitry is further configured to:
determine that the induced current exceeds a predetermined threshold value.

13. The multifunction device of claim 8, wherein the detection circuitry is further configured to:
in response to a determination that the camera module is in an active state, prevent the current from being provided to the at least one coil, wherein the optics assembly is used for focusing and for capturing images during the active state of the camera module, and wherein the optics assembly is not used for focusing or for capturing images during an inactive state of the camera module, and wherein the camera module consumes more power while in the active state than while in the inactive state.

14. The multifunction device of claim 8, wherein to move the optics assembly toward the particular position or direction, the detection circuitry is further configured to:
cause the optics assembly to move in a direction opposite of the indicated movement by causing the current to be provided in a direction opposite of the induced current.

15. A method, comprising:
detecting, by detection circuitry of a camera module, an induced current in at least one coil of an actuator module caused by movement of the at least one coil with respect to at least one magnet of the actuator module, wherein the camera module comprises the actuator module for moving an optics assembly, and wherein the detected induced current is caused by movement of the optics assembly of the camera module and indicates movement of the optics assembly in a particular direction; and
in response to detecting the induced current, causing, by the detection circuitry, a current to be provided to the at least one coil, wherein the provided current causes the optics assembly to move toward a particular position or direction.

16. The method of claim 15, further comprising:
preventing, by the detection circuitry, the optics assembly from contacting at least one mechanical stop of the camera module while the current is provided by causing driver circuitry to provide the current.

17. The method of claim 15, further comprising:
determining, by the detection circuitry, a direction of the induced current; and
in response to determining the direction of the induced current, causing, by the detection circuitry, the current to be provided to the at least one coil in a direction opposite of the determined direction.

18. The method of claim 15, further comprising:
performing, by the detection circuitry, signal processing of a signal that is based on the detected induced current; and
in response to determining that one or more results of the signal processing meet predetermined criteria, causing, by the detection circuitry, the current to be provided to the at least one coil.

19. The method of claim 15, further comprising:
determining, using at least one comparator of the detection circuitry, a direction of the induced current; and
in response to determining the direction of the induced current, causing, by the detection circuitry, the current to be provided to the at least one coil in a direction opposite of the determined direction.

20. The method of claim 15, wherein the current causes the optics assembly to move in a direction opposite of the indicated movement in response to causing, by the detection circuitry, the current to be provided in a direction opposite of the induced current.

* * * * *